No. 777,546.

Patented December 13, 1904.

UNITED STATES PATENT OFFICE.

LEIGH ROY SCHAAP, OF LOVELAND, COLORADO, ASSIGNOR TO THE NATIONAL BRAZING COMPOUND COMPANY, OF DENVER, COLORADO.

PROCESS OF BRAZING.

SPECIFICATION forming part of Letters Patent No. 777,546, dated December 13, 1904.

Original application filed April 18, 1904, Serial No. 203,745. Divided and this application filed June 3, 1904. Serial No. 210,983.

(No model.)

*To all whom it may concern:*

Be it known that I, LEIGH ROY SCHAAP, a citizen of the United States, residing at Loveland, in the county of Larimer and State of Colorado, have invented a certain new and useful Process of Brazing; and I do declare the following to be a full, clear, and exact description of the invention, such as will enable others skilled in the art to which it appertains to make and use the same.

This invention relates to a process for brazing; and the invention is adapted for use in brazing those metals—such as cast-iron, aluminium, and copper—which heretofore have been found difficult or impossible to braze by the use of ordinary brazing methods. This process includes the treating of the parts to be united by the use of prussiate of potash. The yellow prussiate of potash is preferred. Either of the prussiates of potash, however, may be successfully employed. Whenever the term "prussiate of potash" is hereinafter employed, it must be considered to include both the red and yellow species. These ingredients are commonly known by the name specified. However, the term "potassium ferrocyanid" is a more technical term for the yellow prussiate of potash and "potassium ferricyanid" for the red prussiate of potash. The more common terms, however, will be used in this specification. The process further embraces the completion of the brazing act by the use of other elements, such as plaster-of-paris and charcoal, to prevent the prussiate of potash from spreading, citric acid for the purpose of cleansing the parts to be united, and the use of borax, the use of the last-named element being old in the brazing art.

The subject-matter of this application is divided out of an application filed by me April 18, 1904, Serial No. 203,745.

In carrying out my improved process it is preferred to apply the prussiate of potash, together with the charcoal, plaster-of-paris, and citric acid, first, and, finally, the borax, though all of these elements may be applied at the same time, if desired.

In practicing the process the parts to be united are placed in suitable proximity to each or as close together as practicable. They are then raised to a brazing heat by the use of gas-burners or by the application of heat in any other suitable manner. The prussiate of potash is then applied to the joint to be brazed or to the line of division between the two parts to be united. At the same time and in combination therewith the plaster-of-paris, wood-charcoal, and citric acid, if used, are also applied, though good results may be obtained by the use of the prussiate of potash alone. The borax is then used. Good results are obtained by using these elements in the following proportions: prussiate of potash, two ounces; plaster-of-paris, two ounces; wood-charcoal, one-half ounce; citric acid, one ounce; borax or boracic acid, two ounces.

It must be understood that I do not limit the invention to the use of precise proportions, since I am aware that they may be considerably or even greatly varied without departing from the spirit of the invention.

The subject-matter of this application is described in my application filed April 18, 1904, and hereinbefore referred to; but the claims forming a part of this application are not made in the said original application.

Having thus described my invention, what I claim is—

1. The herein-described process for preparing metals for brazing, consisting in raising the parts to be united to a suitable temperature, applying prussiate of potash, plaster-of-paris, wood-charcoal and citric acid, to the parts to be united, and finally applying borax, substantially as described.

2. A process of brazing consisting in raising the parts to be united to a suitable temperature, and applying prussiate of potash, plaster-of-paris, charcoal, citric acid and borax thereto in suitable proportions and finally applying the brazing metal, substantially as described.

3. The herein-described process for preparing metals for brazing, consisting in raising the parts to be united to a suitable temperature, applying yellow prussiate of potash, plaster-of-paris, wood-charcoal and citric acid, to the parts to be united, and finally applying borax, substantially as described.

4. A process of brazing consisting in raising the parts to be united to a suitable temperature, and applying yellow prussiate of potash, plaster-of-paris, charcoal, citric acid and borax thereto in suitable proportions and finally applying the brazing metal, substantially as described.

In testimony whereof I affix my signature in presence of two witnesses.

LEIGH ROY SCHAAP.

Witnesses:
    DENA NELSON,
    A. J. O'BRIEN.